(12) United States Patent
Gustafson et al.

(10) Patent No.: US 12,508,014 B2
(45) Date of Patent: Dec. 30, 2025

(54) ANCHORS AND ANCHORING SYSTEMS

(71) Applicant: Medos International Sarl, Le Locle (CH)

(72) Inventors: Adam Gustafson, Rehoboth, MA (US); Kevin F. Bonner, Virginia Beach, VA (US); Mark H. Getelman, Tarzana, CA (US); David R. Diduch, Charlottesville, VA (US)

(73) Assignee: Medos International Sarl, Le Locle (CH)

( * ) Notice: Subject to any disclaimer, the term of this patent is extended or adjusted under 35 U.S.C. 154(b) by 200 days.

(21) Appl. No.: 17/516,241

(22) Filed: Nov. 1, 2021

(65) Prior Publication Data

US 2023/0139487 A1     May 4, 2023

(51) Int. Cl.
    *A61B 17/04*     (2006.01)
    *A61B 17/64*     (2006.01)
    (Continued)

(52) U.S. Cl.
    CPC .............. *A61B 17/0401* (2013.01); *A61B 2017/00455* (2013.01); *A61B 2017/0409* (2013.01);
    (Continued)

(58) Field of Classification Search
    CPC ........ A61B 17/0401; A61B 2017/0456; A61B 90/90; A61B 2017/00455; A61B 17/0485;
    (Continued)

(56) References Cited

U.S. PATENT DOCUMENTS

5,632,748 A    5/1997    Beck, Jr. et al.
5,891,168 A *   4/1999    Thal .................... A61F 2/0811
                                              606/232

(Continued)

FOREIGN PATENT DOCUMENTS

EP           1702575 A2     9/2006
JP         2018126510 A    8/2018
(Continued)

OTHER PUBLICATIONS

Calcaneal Tendon Suture Anchor Gravity, medicalexpo.com, Accessed from https://www.medicalexpo.com/prod/wright-medical-technology/product-81514-948539.html, 2023, 2 pages.

(Continued)

*Primary Examiner* — Jing Rui Ou
(74) *Attorney, Agent, or Firm* — Barnes & Thornburg LLP

(57) ABSTRACT

Anchors for anchoring soft tissue to bone are provided. In one exemplary embodiment, an anchor can include a non-threaded, asymmetric anchor body having a distal nose and a spine extending proximally from one side of the distal nose, and a deflectable clip extending proximally from a side of the nose opposite the spine. The spine defines a back surface of the anchor body. The spine has an outer bone engaging surface, an inner tissue seating surface opposite the outer bone engaging surface, and opposed lateral sides. The deflectable clip and a portion of the spine defines a guide region configured to accommodate and shield a leading end of a soft tissue to be attached to bone. Soft tissue anchoring systems and methods for inserting an anchor into bone are also provided.

20 Claims, 11 Drawing Sheets

(51) Int. Cl.
*A61B 17/00* (2006.01)
*A61B 17/86* (2006.01)
*A61B 90/90* (2016.01)

(52) U.S. Cl.
CPC .............. *A61B 2017/0414* (2013.01); *A61B 2017/0427* (2013.01); *A61B 2017/0456* (2013.01); *A61B 2017/0458* (2013.01); *A61B 17/0485* (2013.01); *A61B 17/64* (2013.01); *A61B 17/86* (2013.01); *A61B 90/90* (2016.02)

(58) Field of Classification Search
CPC .... A61B 2017/0414; A61B 2017/0409; A61B 2017/0427; A61B 2017/0458; A61B 16/064; A61B 17/86
See application file for complete search history.

(56) References Cited

U.S. PATENT DOCUMENTS

| | | | |
|---|---|---|---|
| 5,989,259 | A | 11/1999 | Penenberg et al. |
| 5,993,459 | A | 11/1999 | Larsen et al. |
| D585,547 | S | 1/2009 | Bisleri |
| D605,288 | S | 12/2009 | Brostoff et al. |
| 8,048,158 | B2 | 11/2011 | Hays et al. |
| 8,114,128 | B2 | 2/2012 | Cauldwell et al. |
| D668,924 | S | 10/2012 | Molina et al. |
| D692,134 | S | 10/2013 | Lee-Sepsick |
| 8,758,367 | B2 | 6/2014 | Philippon et al. |
| 8,882,801 | B2 | 11/2014 | Dimatteo et al. |
| 9,050,077 | B2 | 6/2015 | Nguyen et al. |
| 9,060,748 | B2 | 6/2015 | Housman et al. |
| 9,107,745 | B2 | 8/2015 | Bouduban et al. |
| 9,179,950 | B2 | 11/2015 | Zajac et al. |
| 9,510,820 | B2 | 12/2016 | Hernandez et al. |
| D783,166 | S | 4/2017 | Champ et al. |
| D785,795 | S | 5/2017 | Amano |
| 9,795,421 | B2 | 10/2017 | Mundis, Jr. et al. |
| 10,080,646 | B2 | 9/2018 | McCarty, III |
| 10,105,133 | B2 | 10/2018 | Hester et al. |
| D854,686 | S | 7/2019 | Gravett et al. |
| 10,743,981 | B2 | 8/2020 | McCarty, III |
| D1,031,980 | S | 6/2024 | Gustafson et al. |
| 2003/0195405 | A1 | 10/2003 | Marino et al. |
| 2004/0068262 | A1 | 4/2004 | Lemos et al. |
| 2006/0282083 | A1* | 12/2006 | Fanton ............... A61B 17/0401 606/232 |
| 2008/0262302 | A1 | 10/2008 | Azarbarzin et al. |
| 2010/0069923 | A1 | 3/2010 | Nguyen et al. |
| 2010/0312189 | A1 | 12/2010 | Shelton, IV et al. |
| 2015/0142024 | A1* | 5/2015 | Arai ...................... A61F 2/0811 606/151 |
| 2017/0035552 | A1* | 2/2017 | Fallin ............... A61B 17/06133 |
| 2019/0029806 | A1 | 1/2019 | Piccirillo et al. |
| 2019/0059874 | A1* | 2/2019 | Rogers ............... A61B 17/0401 |
| 2019/0076167 | A1 | 3/2019 | Fantuzzi et al. |
| 2021/0259820 | A1 | 8/2021 | Picha et al. |
| 2023/0277168 | A1* | 9/2023 | Griguol ............. A61B 17/0401 606/232 |

FOREIGN PATENT DOCUMENTS

| | | |
|---|---|---|
| WO | 0232345 A2 | 4/2002 |
| WO | 2009012265 A2 | 1/2009 |
| WO | 2011130532 A2 | 10/2011 |
| WO | 2016186854 A1 | 11/2016 |
| WO | 2017152026 A1 | 9/2017 |
| WO | 2019191022 A1 | 10/2019 |

OTHER PUBLICATIONS

International Search Report and Written Opinion for Application No. PCT/EP/2022/080390 date of mailing Feb. 13, 2023 (17 pages).

* cited by examiner

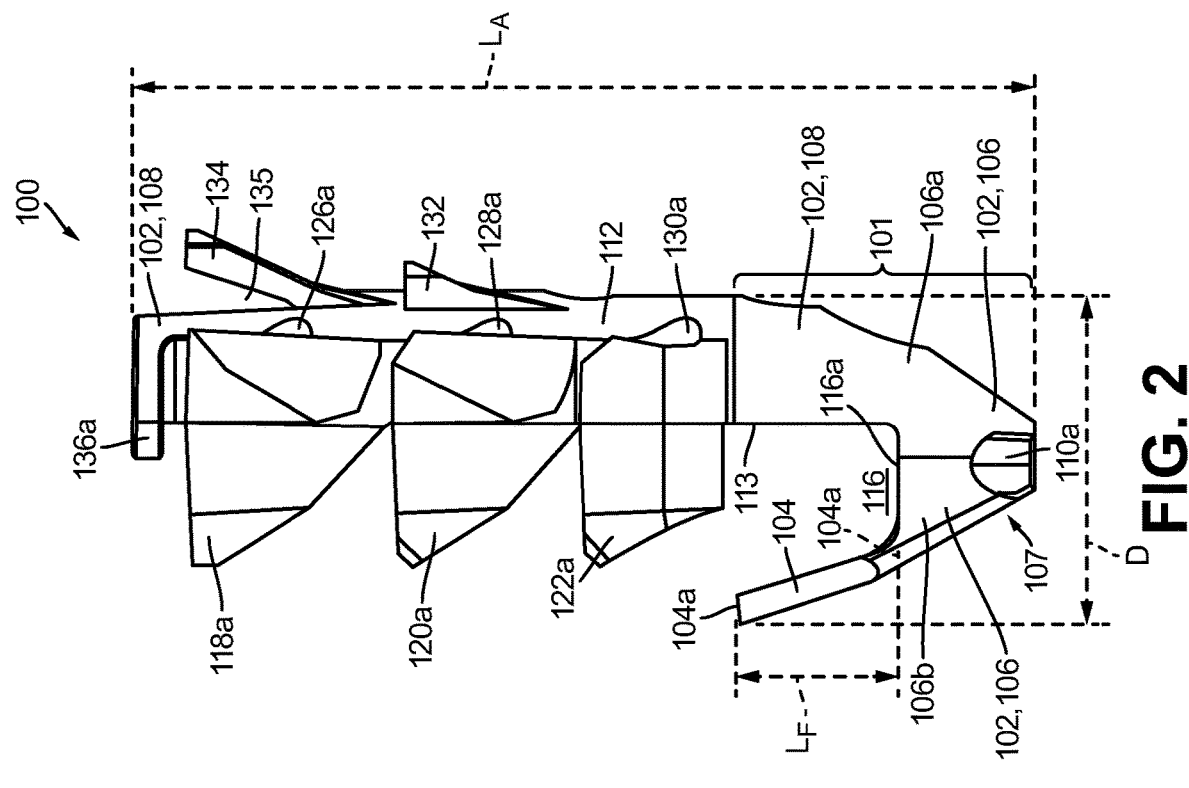
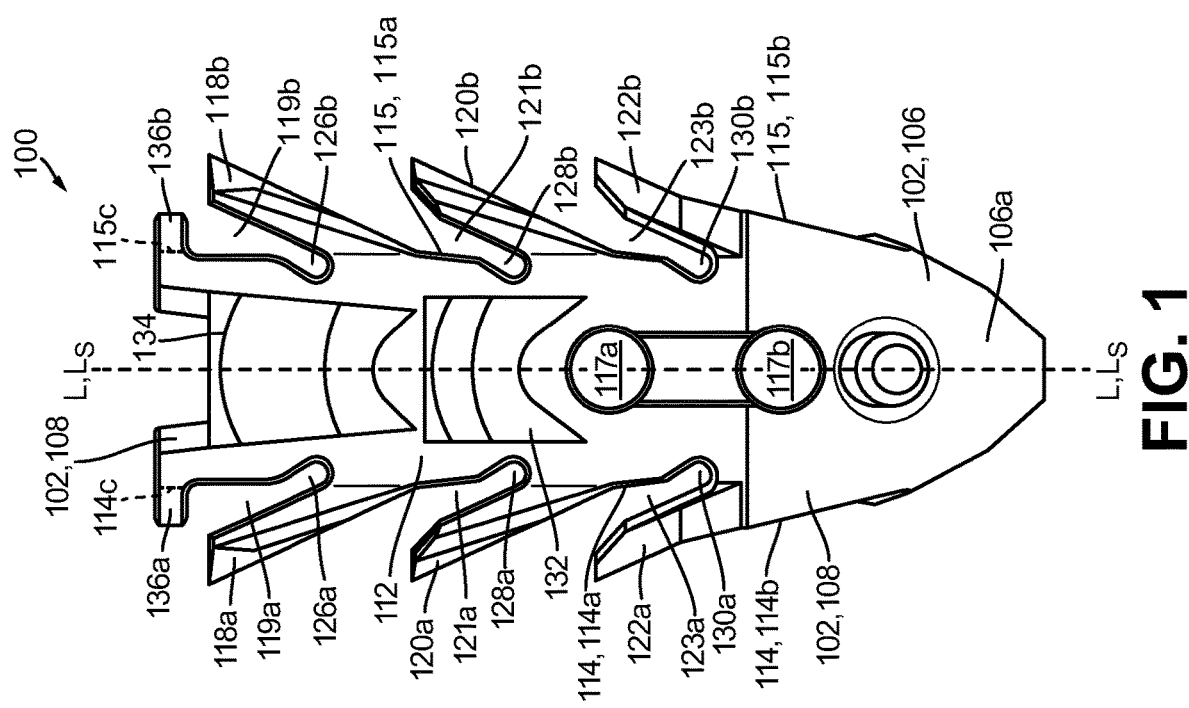

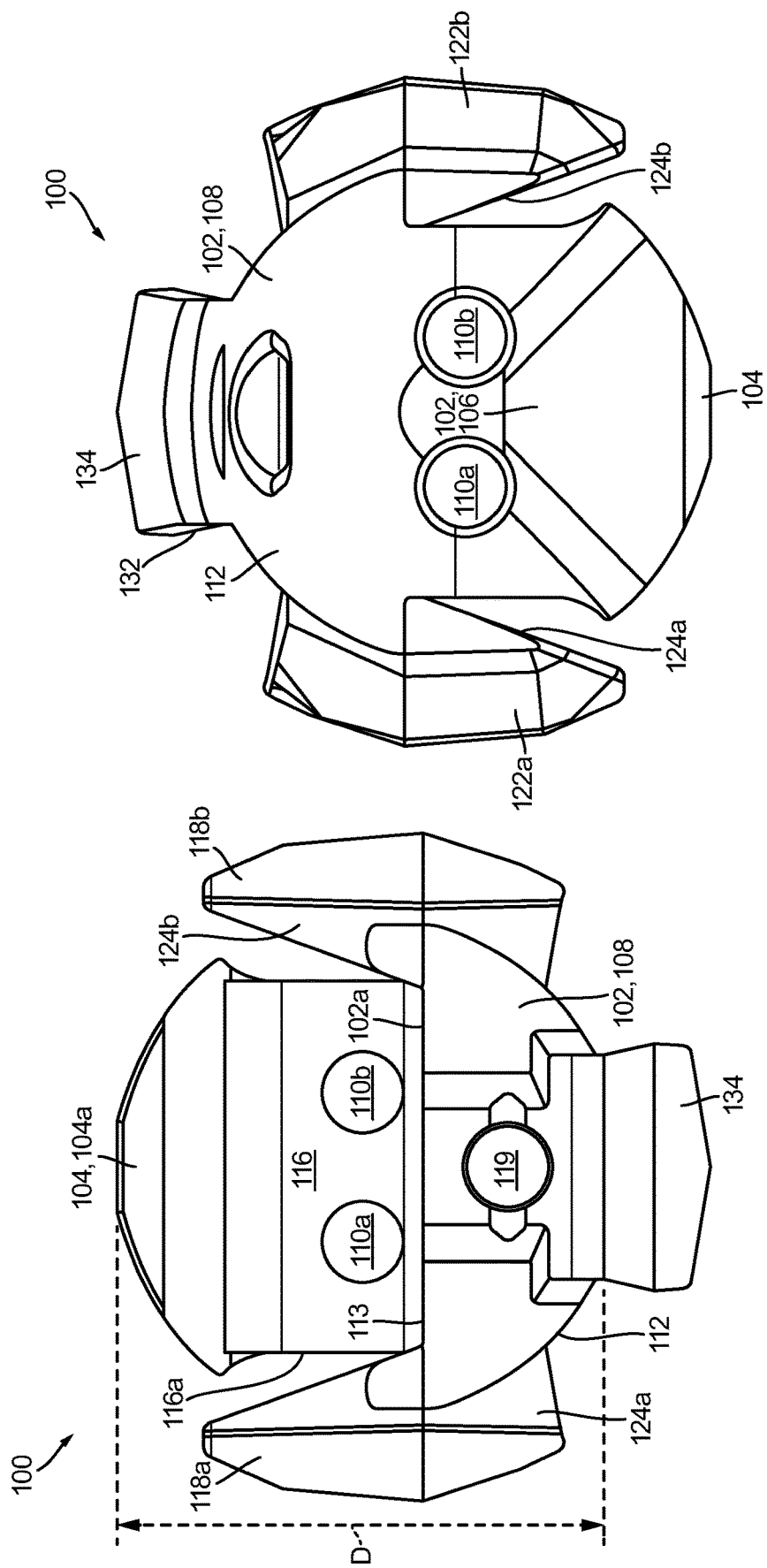

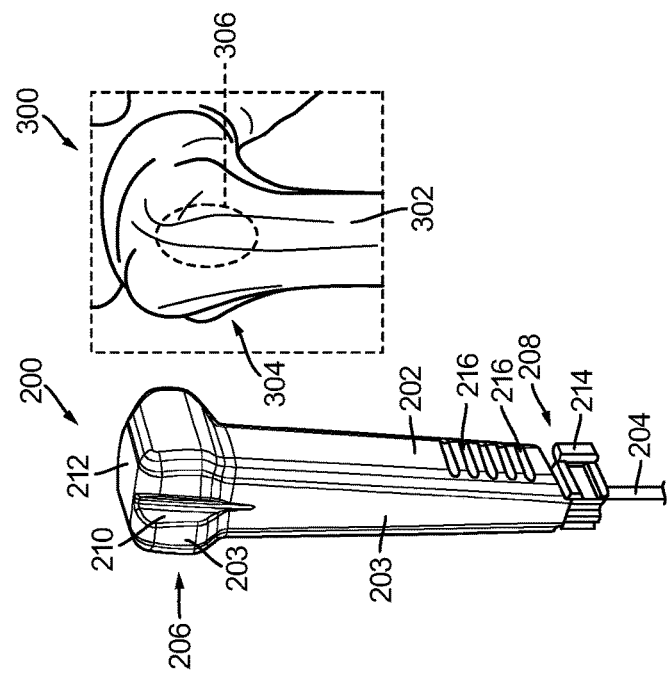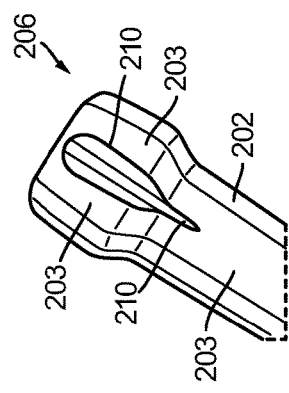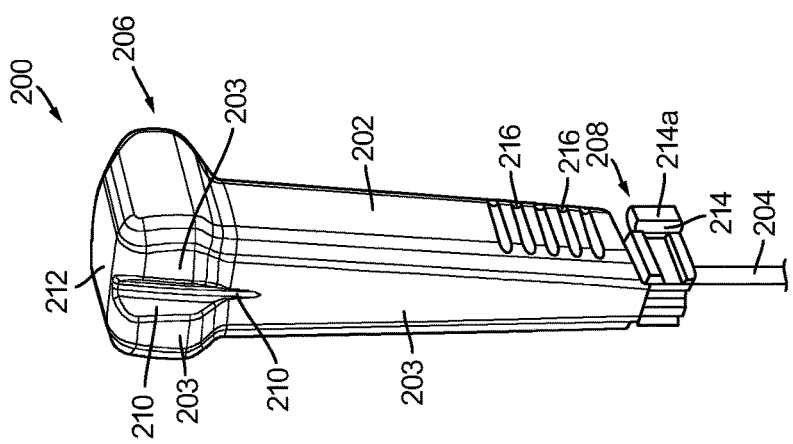
FIG. 8
FIG. 9
FIG. 7

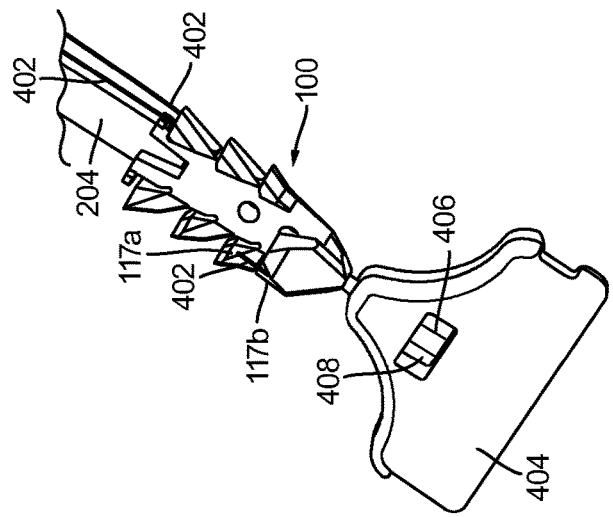
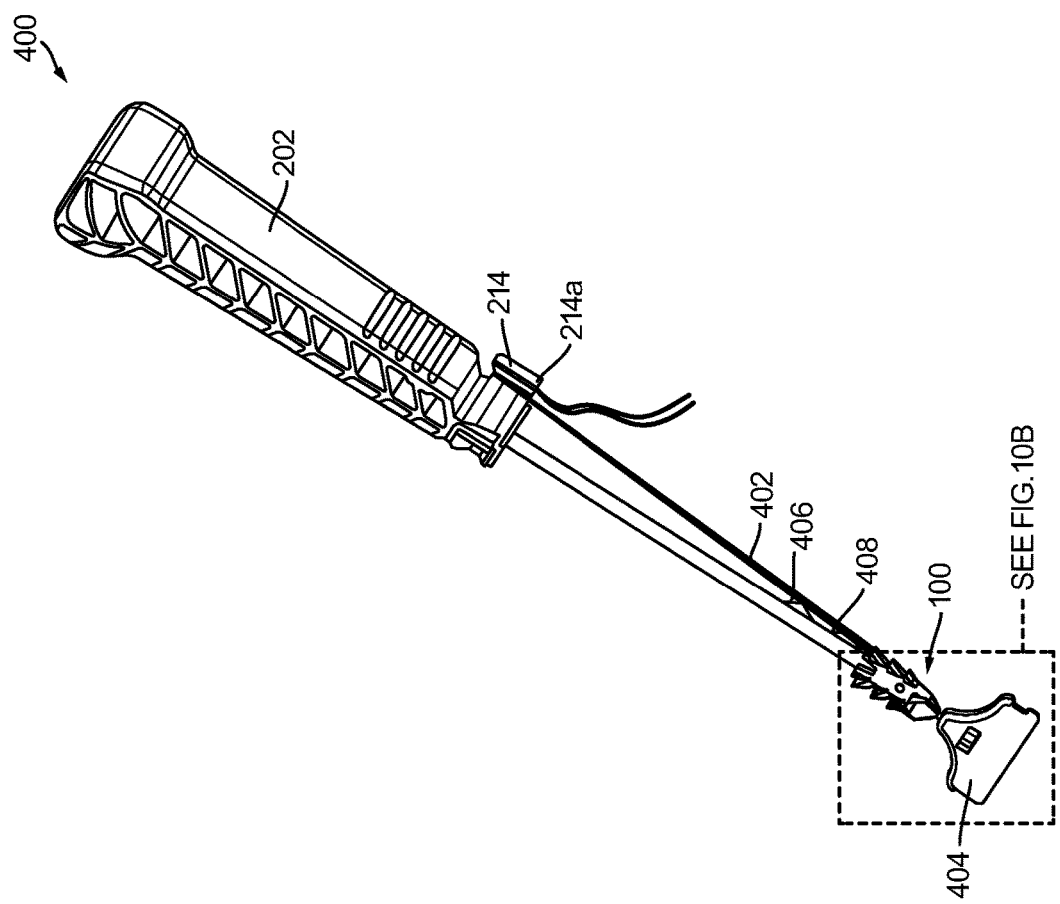
FIG. 10B
FIG. 10A

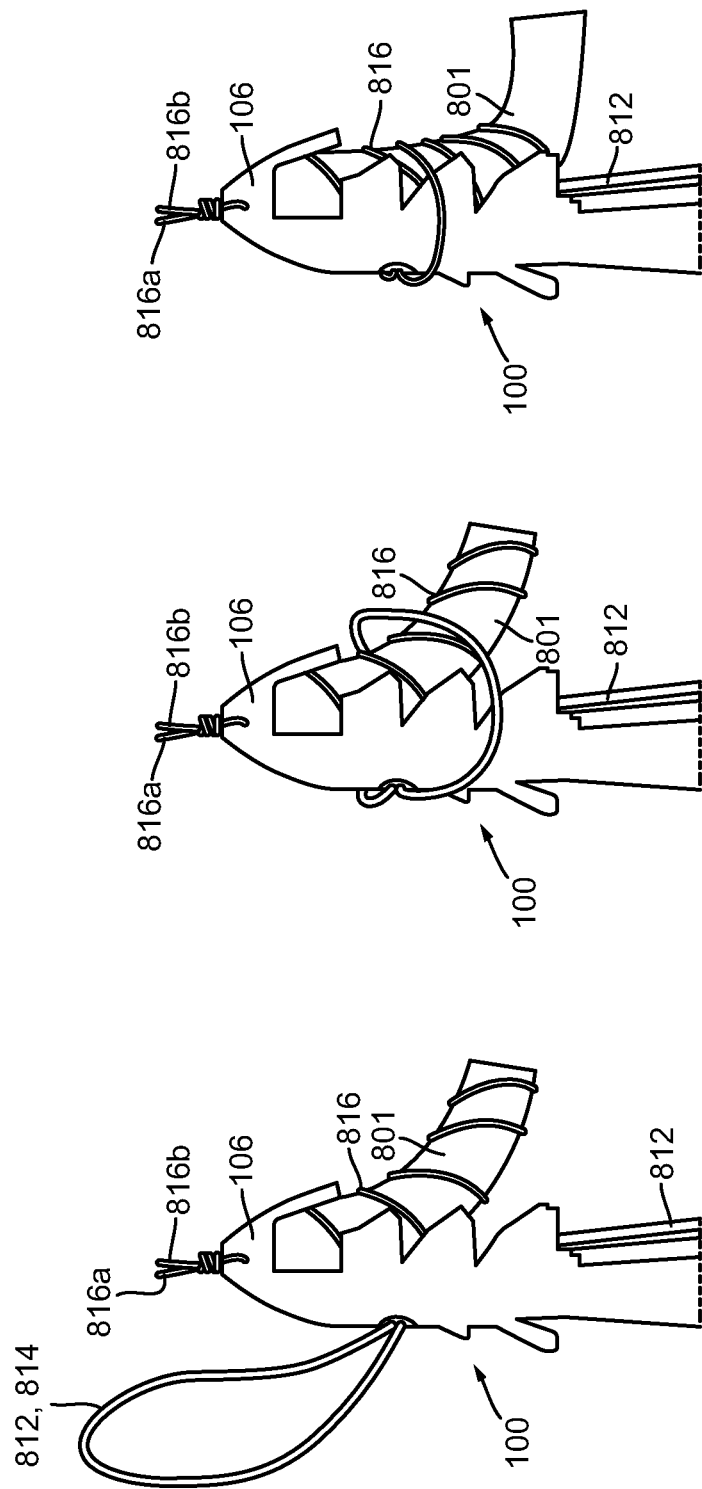

ANCHORS AND ANCHORING SYSTEMS

FIELD

The present invention relates generally to anchors, anchoring systems, and methods for using the same for anchoring soft tissue to bone.

BACKGROUND

The complete or partial detachment of ligaments, tendons, and/or other soft tissues from their associated bones within the body are relatively commonplace injuries, particularly among athletes. Such injuries are generally the result of excessive stresses being placed on these tissues. By way of example, tissue detachment may occur as the result of an accident such as a fall, over-exertion during a work-related activity, during the course of an athletic event, or in any one of many other situations and/or activities.

In the case of a partial detachment, the injury will frequently heal itself, if given sufficient time and if care is taken not to expose the injury to further undue stress. In the case of complete detachment, however, surgery may be needed to re-attach the soft tissue to its associated bone or bones. Numerous suture anchors are currently available to re-attach soft tissue to bone. Examples of such currently-available devices include screws, staples, suture anchors, and tacks.

In soft tissue re-attachment procedures utilizing suture anchors, such as push in style anchors, an anchor-receiving hole is generally first drilled in the bone at the desired point of tissue re-attachment. A suture anchor is then attached to soft tissue and then deployed in the hole using an appropriate installation tool. However, inserting the end of soft tissue (e.g., a tendon) into a blind hole can be a challenge as the soft tissue end has a tendency to interface with and catch on the hole (e.g., an edge of the hole) while the suture anchor is being deployed in the hole. Further, with current push in style anchors, when tying the soft tissue to the suture anchor, the distal end of the soft tissue can be pulled against the suture anchor in such a way to cause the soft tissue to flower out and create a bulbous end. As a result, the soft tissue can slide away from the suture anchor while the suture anchor is being inserted into the hole. Once the suture anchor has been driven into bone, the suture and the soft tissue cannot be adjusted to adjust the position of the soft tissue relative to the bone because the driven suture anchor holds the suture and soft tissue in place.

Accordingly, there remains a need for improved anchors and anchoring systems for attaching soft tissue to bone.

SUMMARY

Anchors for anchoring soft tissue to bone are provided. In one exemplary embodiment, an anchor can include a non-threaded, asymmetric anchor body having a distal nose and a spine extending proximally from one side of the distal nose, and a deflectable clip extending proximally from a side of the nose opposite the spine. The spine defines a back surface of the anchor body. The spine has an outer bone engaging surface, an inner tissue seating surface opposite the outer bone engaging surface, and opposed lateral sides. The deflectable clip and a portion of the spine defines a guide region configured to accommodate and shield a leading end of a soft tissue to be attached to bone.

The distal nose can have a variety of configurations. In some embodiments, a distal tip of the distal nose can have at least two suture holes extending longitudinally therethrough. In such embodiments, the at least two suture holes can be positioned laterally adjacent to each other. In other such embodiments, the at least two suture holes can be configured to receive an operative suture to maintain the leading end of the soft tissue at a distal end of the guide region.

In some embodiments, the anchor can include a plurality of pairs of deflectable wings extending from the lateral sides of the spine, in which each pair can be spaced longitudinally along the spine with each wing having a portion that extends above and beyond the tissue seating surface of the spine to define a soft tissue encompassing side surface. In such embodiments, the anchor can include at least one pair of suture recesses positioned proximally adjacent to at least one pair of deflectable wing. Each suture recess can be configured to at least partially house a suture, and each suture recess can extend through a lateral side of the anchor body such that a suture seated within the suture recess does not interfere with the deflection of the deflectable wings. In such embodiments, each suture recess can extend through the lateral side of the anchor body along a path that is at least partially arcuate.

In some embodiments, the anchor can include at least one bone engaging barb formed on the outer bone engaging surface.

The anchor body can have a variety of configurations. In some embodiments, the anchor body can have at least one bore formed at a proximal end of the anchor body and extending distally into the anchor body. The bore can be configured to receive a distal end of an inserter instrument.

In some embodiments, the anchor can include at least one deflectable back wing extending from the outer bone engaging surface.

In some embodiments, the anchor can include a pair of orientation tabs extending laterally from a proximal end of the lateral sides of the spine. The pair of orientation tabs can be configured to restrict lateral movement of the anchor when it is inserted into bone.

Soft tissue anchoring systems are also provided. In one exemplary embodiment, a system can include a non-threaded, asymmetric anchor being configured to be inserted into bone and an inserter instrument that is configured to removably couple to and push the anchor into bone. The anchor includes a distal nose with a longitudinal axis extending therethrough, a spine extending proximally from one side of the distal nose, and a flexible flange extending proximally from a side of the distal nose opposite the spine. The spine is offset from the longitudinal axis and the spine and the distal nose define a length of the anchor. The flexible flange and a portion of the spine defines a tissue receiving recess proximate and adjacent to the distal nose, and the flexible flange being effective to capture a soft tissue segment within the recess during insertion. The inserter instrument has a handle and an elongated shaft extending from the handle. The handle has a proximal end and a distal end, in which the proximal end has a shape that is representative of a portion of anatomy to which the anchor is to be inserted.

In some embodiments, the portion of the anatomy can be the humerus bone.

The elongated shaft can have a variety of configurations. In some embodiments, the elongated shaft can have an inserter prong at a distal end thereof. The inserter prong can be configured to be received within a bore extending into a proximal end of the anchor to removably couple to the anchor. In some embodiments, the elongated shaft can include at least one marking that is indicative of an insertion depth of the anchor when the anchor is being inserted into bone.

The handle can have a variety of configurations. In certain embodiments, the proximal end of the handle can be wider than the distal end of the handle.

The flexible flange has a variety of configurations. In some embodiments, the flexible flange has a length that can be less than the length of the anchor.

Methods for inserting an anchor into bone are also provided. In one exemplary embodiment, a method can include coupling a non-threaded anchor to an inserter instrument, the anchor having a distal nose and a spine extending proximally from one side of the distal nose, connecting a soft tissue to the anchor with a leading end of the soft tissue positioned within a guide region of the anchor, the guide region being formed, in part, by a deflectable clip extending proximally from the distal nose, the soft tissue being connected to the anchor with an operative suture that extends through the distal nose, and pushing the anchor with the soft tissue connected thereto into a bone socket to attach the soft tissue to bone.

The inserter instrument can have a variety of configurations. In some embodiments, the inserter instrument includes a handle having a proximal end and a distal end. The proximal end of the handle can have a shape that is representative of a portion of anatomy having the bone socket formed therein.

In some embodiments, coupling the anchor to the inserter instrument includes threading a removable stay suture through at least one hole extending through the anchor and cleating free ends of the stay suture to the handle.

BRIEF DESCRIPTION OF THE DRAWINGS

This invention will be more fully understood from the following detailed description taken in conjunction with the accompanying drawings, in which:

FIG. 1 is back view of an exemplary embodiment of an anchor;

FIG. 2 is a side view of the anchor of FIG. 1;

FIG. 5 is a top-down view of the anchor of FIG. 1;

FIG. 6 is a bottom-up view of the anchor of FIG. 1;

FIG. 7 is a front perspective view of an exemplary embodiment of an inserter instrument having a handle and an elongated shaft extending from the handle;

FIG. 8 is a schematic illustrating a portion of the inserter instrument positioned next to a portion of a shoulder, showing the anatomical similarities between the handle and the portion of the shoulder;

FIG. 9 is a magnified front perspective view of a top portion of the inserter instrument of FIG. 7;

FIG. 10A is a back perspective view of an exemplary embodiment of a soft anchoring system with the anchor of FIG. 1 coupled to the inserter instrument of FIG. 7;

FIG. 10B is a magnified view of a distal portion of the soft anchoring system of FIG. 10A;

FIG. 13A is a magnified side view of a distal portion of the soft anchoring system of FIG. 12 with the stay suture removed, showing a loop of the fixation suture and a soft tissue segment connected to the anchor;

FIG. 13B is the distal portion of the soft anchoring system of FIG. 13A, showing the loop passed over the anchor and connected soft tissue segment;

FIG. 13C is the distal portion of the soft anchoring system of FIG. 13B, showing the loop in a tightened configuration;

DETAILED DESCRIPTION

Figure 4:
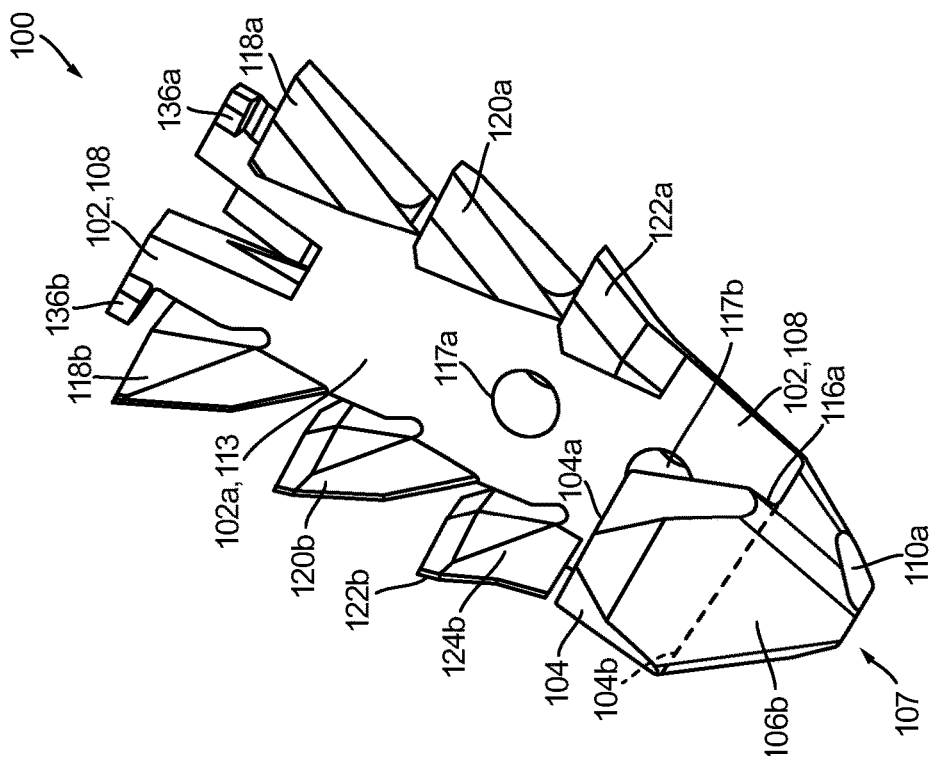
FIG. 4 is a front perspective view of the anchor of FIG. 1.

Certain exemplary embodiments will now be described to provide an overall understanding of the principles of the structure, function, manufacture, and use of the anchors, anchoring systems, and methods disclosed herein. One or more examples of these embodiments are illustrated in the accompanying drawings. Those skilled in the art will understand that the anchors, anchoring systems, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

In general, non-threaded anchors (e.g., push in style anchors), soft tissue anchoring systems, and methods of using the same are provided. In one exemplary embodiment, the non-threaded anchor includes an anchor body having a guide region that is formed, in part, by a deflectable clip (e.g., a flexible flange). The guide region is configured to accommodate and shield a leading end of a soft tissue to be attached to bone. That is, during use, the non-threaded anchor is designed to provide better control of the soft tissue, e.g., during insertion into bone. It will be appreciated that absent such deflectable clip, the soft tissue can peel back and away from the non-threaded anchor as the non-threaded anchor is inserted into bone. This is at least because when attaching the soft tissue to the non-threaded anchor, the soft tissue is pulled towards the distal face of the non-threaded anchor causing the leading end of the soft tissue to flower out (e.g., sliding outward and away from the anchor) and create a bulbous end. Beneficially, with the incorporation of this deflectable clip, the form of the leading end of the soft tissue can be controlled, e.g., while being threaded and knotted to the non-threaded anchor and inserted into bone. As such, constraining the soft tissue within the guide region of the non-threaded anchor can reduce the risk of the soft tissue catching on bone (e.g., the edge of the aperture of a bone socket) during insertion. Additionally, this can increase visualization of the aperture of the bone socket and reduce wrapping of the soft tissue around the sides (e.g., including deflectable side wings, if present) of the non-threaded anchor.

Further, in exemplary embodiments, a soft tissue anchoring system can include a non-threaded anchor and an inserter instrument that is configured to removably couple to and push the non-threaded anchor into bone. The non-threaded anchor can have any configuration, such as the configurations described herein, that is suitable for being inserted into bone. The inserted instrument includes a handle having a proximal end and a distal end, and an elongated shaft extending from the handle.

The non-threaded anchors described herein can be asymmetrical. In such instances, this creates a desired insertion orientation, and therefore, a visual or tactile indicator could be employed on the inserter instrument to help demonstrate to the user the insertion orientation of the non-threaded anchor during use. For example, in some embodiments, the proximal end of the handle of the inserter instrument has a shape that is representative of a portion of anatomy to which the non-threaded anchor is to be inserted. The term "representative" can adopt its ordinary and usual meaning as understood by a person skilled in the art. For example, a structure (e.g., the handle of the inserted instrument) that is representative of a portion of anatomy can have one or more dimensions and surfaces (e.g., one or more outer surfaces) that are the same or approximately the same as that of a predetermined anatomy, within manufacturing tolerances and generally understood anatomical variations. Beneficially, this handle configuration can provide to the user (e.g., medical practitioner) a more intuitive indicator as to the orientation of the non-threaded anchor coupled thereto. By way of example, the handle can be made into a stylized bone shape modeled after the bone the anchor will be implanted into.

The portion of the anatomy can have a variety of configurations. For example, in some embodiments, the portion of the anatomy is the humerus bone. In such embodiments, landmarks on the humerus bone (e.g., bicipital groove) can be used as a primary indicator of non-threaded anchor orientation. In such instances, the desired orientation can be arranged such the handle form "aligns" to the anatomy (e.g., approximate rotation about the longitudinal axis of the inserter instrument relative to the longitudinal axis of the bone). Other exemplary suitable portions of the anatomy can include joints, hip, femur, tibia, patella, ankle, elbow, etc.

In some embodiments, the non-threaded anchors and soft tissue anchoring systems described herein can be used in a biceps repair procedure in which a biceps tendon is attached to bone. In other embodiments, the non-threaded anchors and soft tissue anchoring systems described herein can be used in other types of surgical procedures, such as collateral ligament reconstructions in the knee, in which a hamstring tendon graft is attached to bone using a non-threaded anchor, and in other tenodesis procedures in which a tendon or other soft tissue is attached to bone using a non-threaded anchor. A person skilled in the art will appreciate that the non-threaded anchors, inserter instruments, and methods disclosed herein can be used with a variety of surgical devices, including measuring devices, drills, and mallets, etc.

FIGS. 1-6 illustrate an exemplary embodiment of a non-threaded anchor 100. The non-threaded anchor 100 is asymmetrical and is configured to provide control over the form of attached soft tissue so as to reduce the risk of the soft tissue from adversely interfering with the opening created within the bone as the anchor is being inserted therein. For sake of simplicity, while soft tissue is attached to the non-threaded anchor 100 prior to insertion (e.g., via one or more sutures, e.g., tendon suture 504 in FIGS. 11-14), as described in more detail below, soft tissue is omitted from FIGS. 1-6. The non-threaded anchor 100 includes an anchor body 102 and a deflectable clip 104.

The one or more sutures can be any type of suture and can be made from any of a variety of materials, including natural materials and synthetic materials. Non-limiting examples of suitable materials for the one or more sutures include polymers, such as polyglycolide, polypropylene, polyethylene terephthalate (PET), and polydioxanone, and fabrics, such as nylon and silk. The one or more sutures can be bioabsorbable, partially bioabsorbable, or nonabsorbable, and can have a circular cross section or another cross section.

The anchor body 102 can have a variety of configurations. For example, as shown in FIGS. 1-6, the anchor body 102 includes a distal nose 106 and a spine 108. While the distal nose 106 can have a variety of shapes and sizes, in this illustrated embodiment, the distal nose 106 has a bullet-shape configuration. As further shown, the distal nose 106 has a distal tip 107 that has two suture holes 110a, 110b defined therein that are configured to be used to fixate soft tissue to the non-threaded anchor 100. The two suture holes 110a, 110b can also help prevent over tensioning the soft tissue toward the distal tip 107. The two suture holes 110a, 110b can be arranged within the distal nose 106 in various locations and can extend in various directions relative to longitudinal axis of the distal nose 106.

In this illustrated embodiment, the two suture holes 110a, 110b are positioned laterally adjacent to each other and each extend longitudinally through the distal nose 106 (e.g., extending along the longitudinal axis L of the distal nose 106 (FIG. 1)). Further, in this illustrated embodiment, the two suture holes 110a, 110b are distal facing. While two suture holes 110a, 110b are illustrated in FIGS. 1-6, a person skilled in the art will appreciate that any number of suture holes can be defined within the distal nose and extend through the distal nose in different directions, and therefore the number and extension direction of the suture holes are not limited to what is illustrated in the figures.

The anchor body 102 also includes a spine 108 that extends proximally from one side 106a of the distal nose 106 and is offset from the longitudinal axis L of the distal nose 106. The spine and the distal nose define a length LA of the non-threaded anchor 100. As shown, the spine 108 defines a back surface 102a of the anchor body 102 (see FIGS. 3-5). The spine 108 can have a variety of configurations. For example, in some embodiments, the spine 108 includes an outer bone engaging surface 112, an inner tissue seating surface 113 that is opposite the outer bone engaging surface 112, and opposed first and second lateral sides 114, 115.

While the surfaces and sides of the spine 108 can have a variety of shapes, in this illustrated embodiment, the outer bone engaging surface 112 has a generally curved shape, and the inner tissue seating surface 113 has a generally planar shape (e.g., generally flat or linear). Further, the first lateral side 114 has a first segment 114a that has a generally planar shape (e.g., generally linear) and a second segment 114b that has a generally tapered shape. Similarly, the second lateral side 115 has a first segment 115a that has a generally planar shape (e.g., generally linear) and a second segment 115b that has a generally tapered shape.

Figure 3:
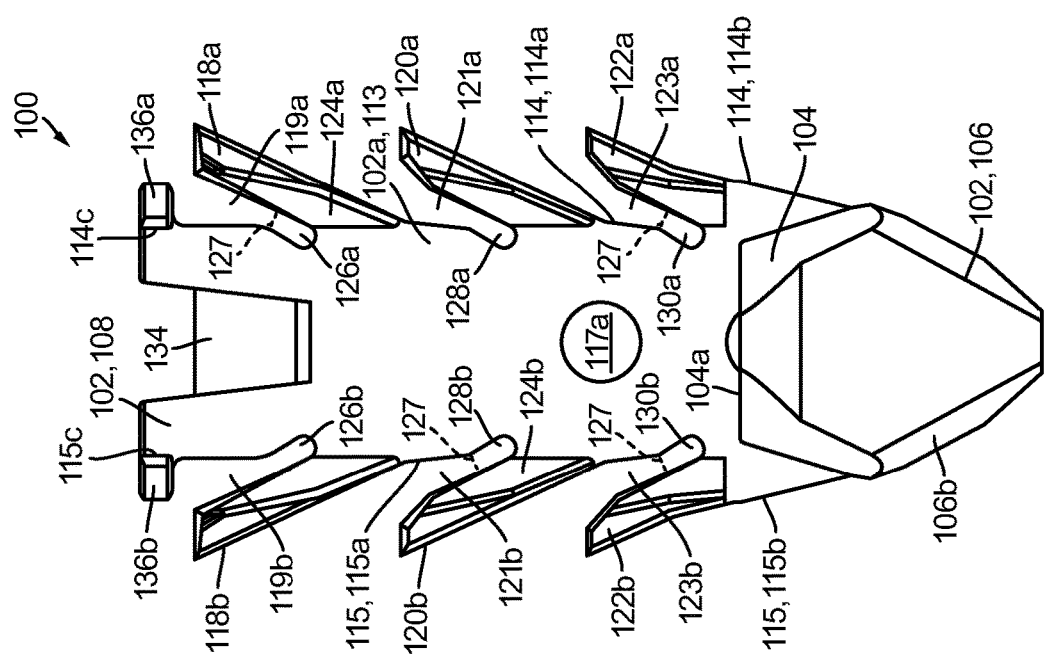
FIG. 3 is a front view of the anchor of FIG. 1.

In some embodiments, the spine 108 can include at least one auxiliary suture hole that is configured to augment the attachment of a soft tissue to the non-threaded anchor 100, provide better control of the orientation of soft tissue attached to the non-threaded anchor 100, or a combination thereof. Further, the at least one auxiliary suture hole can be configured to limit toggling post implantation. While the number of auxiliary suture holes can vary, in this illustrated embodiment, two axially suture holes 117a, 117b are defined within the spine 108. As shown in FIGS. 1, 3 and 4, the two auxiliary suture holes 117a, 117b are positioned longitudinally adjacent to each other and each extend laterally through the spine 108 (e.g., extending laterally relative to the longitudinal axis $L_S$ of the spine 108 (FIG. 1)). While two auxiliary suture holes 117a, 117b are illustrated, a person skilled in the art will appreciate that any number of auxiliary suture holes can be defined within the spine and extend through the spine in different directions, and therefore the number and extension direction of the auxiliary suture holes are not limited to what is illustrated in the figures.

In some embodiments, as shown in FIG. 5, the anchor body 102 has at least one bore 119 that is configured to receive a distal end of an inserter instrument (e.g., inserter instrument 200 in FIGS. 7-9). For example, in certain embodiments, the bore 119 can have a complementary shape relative to the shape of the distal end of the inserted instrument. In this embodiment, the bore 119 has a generally cylindrical shape. In other embodiments, the bore 119 can have other suitable shapes (e.g., generally rectangular). In use, as described in more detail below, once the distal end of the inserter instrument is inserted into the bore 119, the bore 119 helps maintain the position thereof within the non-threaded anchor 100, and thus the resulting impact surface. In certain embodiments, the inserter instrument and non-threaded anchor interface can permit rotation within the body of the patient.

As shown in FIGS. 1-6, the deflectable clip 104 (e.g., a flexible flange) extends proximally from a side 106b of the distal nose 106 opposite the spine 108. As a result, the deflectable clip 104 and a portion of the spine 108 define a guide region 116 (see FIGS. 2 and 5) that is configured to accommodate and shield a leading end of a soft tissue to be attached to bone. For example, in use, while the soft tissue is being attached to the non-threaded anchor, the guide region 116 can reduce the tendency of the soft tissue to extrude out of the side of the non-threaded anchor. Further, the guide region 116 can also prevent the attached soft tissue from catching on bone (e.g., the edge of bone socket) while the non-threaded anchor 100 is being inserted into the bone socket. While the guide region 116 can be positioned at any various locations along the length LA of the non-threaded anchor 100, in this illustrated embodiment, the guide region 116 is proximate and adjacent to the distal nose 106. The guide region 116 can also be referred to herein as a tissue receiving recess. In use, as described in more detail below, the at least two suture holes 110a, 110b are configured to receive an operative suture to maintain a leading end of a soft tissue at a distal end 116a of the guide region 116.

The operative suture(s) can be any type of suture and can be made from any of a variety of materials, including natural materials and synthetic materials. Non-limiting examples of suitable materials for the operative suture(s) include polymers, such as polyglycolide, polypropylene, polyethylene terephthalate (PET), and polydioxanone, and fabrics, such as nylon and silk. The operative suture(s) can be bioabsorbable, partially bioabsorbable, or nonabsorbable, and can have a circular cross section or another cross section.

The deflectable clip has a length LF that extends from a first end 104a to a second end 104b of the deflectable clip. As shown the first end 104a is distal to the distal nose 106. The deflectable clip 104 can have any suitable length that is suitable for capturing and shielding a leading end of soft tissue that is attached to the non-threaded anchor. In this illustrated embodiment, the length LF of the deflectable clip 104 is less that the length LA of the non-threaded anchor 100. The deflectable clip 104 is designed to be flexible. As a result, this can reduce the risk of fracture of the non-threaded anchor 100 (e.g., during non-threaded anchor insertion). In use, as described in more detail below, the deflectable clip 104 is effective to capture a soft tissue segment (e.g., at least a leading end of a soft tissue) within the guide region 116 during non-threaded anchor insertion. This can shield the leading end of the soft tissue segment from getting caught on bone.

While not illustrated, in some embodiments, the non-threaded anchor 100 can also include transverse suture hole(s) (e.g., suture hole(s) that extend laterally relative to the longitudinal axis L of the non-threaded anchor 100) that are positioned proximal to the distal end 116a of the guide region 116. In use, when attaching a soft tissue segment to the non-threaded anchor 100 (e.g., while a suture attached to the soft tissue segment is being threaded and knotted), the transverse suture hole(s) can be used to limit the amount the user can distally advance the leading end of a soft tissue along the non-threaded anchor 100. This can help further reduce the risk of flowering of the leading end.

As further shown in FIGS. 1-6, the non-threaded anchor 100 includes at least one pair of deflectable wings that extend from the lateral sides 114, 115 of the spine 108. The deflectable wings are configured to engage bone to help secure the non-threaded anchor 100 within the bone socket. While the number of pairs can vary, in this illustrated embodiment, the non-threaded anchor 100 includes three pairs of deflectable wings 118a, 118b, 120a, 120b, 122a, 122b, in which one wing 118a, 120a, 122a extends from first lateral side 114 of the spine 108 and the other wing 118b, 120b, 122b extends from the second lateral side 115 of the spine 108. As shown in FIGS. 1 and 3, each deflectable wing 118a, 118b, 120a, 120b, 122a, 122b extends outward from the spine 108 in such a way that creates a respective space 119a, 119b, 121a, 121b, 123a, 123b therebetween. This allows the deflectable wings 118a, 118b, 120a, 120b, 122a, 122b to move (e.g., flex) inward and closer to the spine 108 when the non-threaded anchor 100 is inserted into a bone socket. Further, the deflectable wings 118a, 118b, 120a, 120b, 122a, 122b are resilient so that after they move inward they are biased to return to their original configurations (see FIGS. 1 and 3), thereby increasing the friction between non-threaded anchor and the walls of the bone socket in which the non-threaded anchor 100 is inserted. This increased friction can help secure the non-threaded anchor 100 within the bone socket, and in certain instances, can also resist proximal movement of the non-threaded anchor post-insertion.

Further, the deflectable wings are configured to constrain soft tissue that is positioned against the back surface 102a of the non-threaded anchor 100 so as to prevent the soft tissue from wrapping around the anchor body 102 during insertion. For example, as shown in this illustrated embodiment, each pair of deflectable wings 118a, 118b, 120a, 120b, 122a, 122b is spaced longitudinally along the spine 108 with each wing having a portion that extends above and beyond the inner tissue seating surface 113 of the spine 108 to define a soft tissue encompassing side surface 124a, 124b. That is, wings 118a, 120a, 122a define a first soft tissue encompassing side surface 124a and wings 118b, 120b, 122b define a second soft tissue encompassing side surface 124b. It is also contemplated herein that in other embodiments, the at least one pair of deflectable wings can be omitted.

In some embodiments, the non-threaded anchor 100 can include additional bone engaging features. For example, as shown in FIGS. 1 and 2, the non-threaded anchor includes at least one bone engaging barb 132 that is formed on the outer bone engaging surface 112 of the spine 108 and at least one deflectable back wing 134 that extends from the outer bone engaging surface 112 of the spine 108. While any number of bone engaging barbs and deflectable back wings can be employed, in this illustrated embodiment, there is one bone engaging barb 132 and one deflectable back wing 134. It is also contemplated herein that in other embodiments, the at least one bone engaging barb 132 and/or the at least one deflectable back wing 134 can be omitted.

While the at least one bone engaging barb 132 can have a variety of configurations, in this illustrated embodiment, the at least one bone engaging barb 132 has a tapered configuration. Similarly, the at least one deflectable back wing 134 can have a variety of configurations. As shown, the at least one deflectable back wing 134 extends outward from the spine 108 in such a way that creates a space 135 therebetween. This allows the at least one deflectable back wing 134 to move (e.g., flex) inward and closer to the spine 108 when the non-threaded anchor 100 is inserted into a bone socket. Further, the at least one deflectable back wing 134 is resilient so that after it moves inward it is biased to return to its original configuration (see FIGS. 1 and 2). This creates increased friction against the walls of the bone socket in which the non-threaded anchor 100 is inserted. In certain embodiments, the at least one bone engaging barb 132 is also resilient. Alternatively, or in addition, this increased friction between the at least one deflectable back wing 134 and the spine 108 and/or between the at least one bone engaging barb 132 and the spine 108 can also help resist proximal movement of the non-threaded anchor 100 post-insertion. Various embodiments of other bone engaging features are further described in U.S. Pat. Nos. 8,114,128 and 8,882,801, which are hereby incorporated by reference in their entireties.

Further, the non-threaded anchor 100 includes at least one pair of suture recesses positioned proximally adjacent to at least one pair of deflectable wings, in which each suture recess is configured to at least partially house a suture. This allows a "shoelace capture" or tie band around the soft tissue and non-threaded anchor. The at least one pair of suture recesses also creates a smaller diameter to retain position of the suture once the suture(s) are constricted around the soft tissue and non-threaded anchor at this location. Further, in some embodiments, a narrower section can be placed lateral to these suture recesses to aide retention during assembly of the soft tissue and non-threaded anchor. It is also contemplated herein that in other embodiments, the at least one pair of suture recesses can be omitted.

While the number of pairs of suture recesses can vary, in this illustrated embodiment, the non-threaded anchor 100 includes three pairs of suture recesses 126a, 126b, 128a, 128b, 130a, 130b. As shown, the first pair of suture recesses 126a, 126b are positioned proximally adjacent to the first pair of deflectable wings 118a, 118b, the second pair of suture recesses 128a, 128b are positioned proximally adjacent to the second pair of deflectable wings 120a, 120b, and the third pair of suture recesses 130a, 130b are positioned proximally adjacent to the third pair of deflectable wings 122a, 122b. Further, a narrower section 127 (see FIG. 3) was placed lateral to each suture recess 126a, 126b, 128a, 128b, 130a, 130b.

In this illustrated embodiment, each suture recess 126a, 126b, 128a, 128b, 130a, 130b extends through a lateral side of the anchor body 102. As a result, in use, this prevents a suture that is seated within the suture recess from interfering with the deflection of the deflectable wings. Further, in some embodiments, as shown in FIGS. 1 and 3, each suture recess extends along a path that is at least partially arcuate. In other embodiments, the path can have other suitable shapes. In this illustrated embodiment, suture recesses 126a, 128a, 130a each extend through the first lateral side 114 of the spine 108 and suture recesses 126b, 128b, 130b each extend through the second lateral side 115 of the spine 108. These suture recesses in combination with the suture(s) seated therein can limit toggling post implantation. Further, this combination can be configured to augment the attachment of a soft tissue to the non-threaded anchor 100, provide better control of the orientation of soft tissue attached to the non-threaded anchor 100, or a combination thereof.

As further shown in FIGS. 1-4, the non-threaded anchor 100 includes pair of orientation tabs 136a, 136b that are configured to restrict lateral movement of the non-threaded anchor 100 when the non-threaded anchor 100 is inserted into a bone socket. While the pair of orientation tabs can have a variety of configurations, in some embodiments, as illustrated, each tab 136a, 136 extends laterally from a proximal end of a respective lateral side of the spine 108. More specifically, the first orientation tab 136a of the pair of orientation tabs extends laterally from the proximal end 114c of the first lateral side 114 of the spine 108, and the second orientation tab 136b of the pair of orientation tabs extends laterally from the proximal end 115c of the second lateral side 115 of the spine 108.

Alternatively, or in addition, a maximum outer diameter D of the distal end 101 of the non-threaded anchor 100 (see FIGS. 2 and 5) can be sized in such a way that allows the non-threaded anchor 100 to pilot the center of a bone socket. As a result, this can reduce the positional freedom of the non-threaded anchor 100 within the bone socket and therefore help maintain axial alignment of the non-threaded anchor relative to the bone socket. That is, the maximum outer diameter D of the distal end 101 can help prevent positional deviation of the non-threaded anchor 100 with the respect to the central axis of the bone socket. In some embodiments, the maximum outer diameter D of the distal end 101 can be from about 3 mm to 12 mm or from about 5.4 mm to 9 mm, with a manufacturing tolerance from about 0 mm to 0.25 mm. A person skilled in the art will appreciate that the maximum outer diameter D of the distal end 101 depends at least upon the size and/or shape of the bone socket. The term "diameter" is a straight line distance through opposing sides of the distal end of the non-threaded anchor. For example, a straight line distance from an outer-bone engaging surface of the deflectable clip to an outer bone engaging surface of the segment of the spine that overlaps in length with the deflectable clip (see FIGS. 2 and 5). A "diameter" as used herein is not limited to a structure with a circular or even rounded cross-section.

To attach soft tissue to bone, a bone socket (e.g., bore, hole, and the like) can be formed in bone of a patient, such as by using a drill, an awl, a punch instrument, etc., as will be appreciated by a person skilled in the art. A diameter of the bone socket can be slightly less than a maximum outer diameter of the non-threaded anchor to be disposed within the bone socket, and a length of the bone socket can be the same as or slightly greater than a length of the non-threaded anchor. The bone socket can extend fully through the cortical bone to allow the non-threaded anchor to be fully engaged through the thickness of the cortical bone. The bone socket can also extend into the cancellous bone depending on the length of the non-threaded anchor.

Any suitable inserter instrument can be used to drive a non-threaded anchor (e.g., non-threaded anchor 100) into bone (e.g., into the formed bone socket). In general, the inserter instrument (e.g., inserter instrument 200) includes a handle and an elongated shaft extending therethrough. In use, the non-threaded anchor is coupled to a distal end of the elongated shaft. For example, the distal end of the elongated shaft can be inserted into the non-threaded anchor (e.g., inserted into a bore 119 of non-threaded anchor 100 in FIG. 5) and a removable stay suture (stay suture 402 in FIGS. 10A-10B) can be threaded through holes of the non-threaded anchor (e.g., auxiliary suture holes 117a, 117b of non-threaded anchor 100 in FIG. 1) and the free ends of the removable stay suture can be wrapped around one or more cleats (e.g., cleat 214 in FIG. 7) of the handle. A soft tissue can then be connected (e.g., threaded and knotted or threaded and locked (e.g., via a lock loop device)) to the non-threaded anchor. Once the soft tissue is connected to the non-threaded anchor, the inserter instrument can then be used to insert and drive (e.g., push) the non-threaded anchor and connected soft tissue into a formed bone socket. Once the non-threaded anchor and connected soft tissue are driven to its desired position within the bone socket, the removable stay suture can be released from the one or more cleats and removed from the inserter instrument, followed by the removal of the inserter instrument from the non-threaded anchor.

The handle can have any suitable shape that is configured to facilitate grasping and manipulation of the inserter instrument. While the shape can vary, in some embodiments, the handle has a generally cylindrical.

In instances where there is a desired insertion orientation for an anchor (e.g., when the anchor is asymmetrical, e.g., non-threaded anchor 100 in FIGS. 1-6), a visual or tactile indicator could be employed on the inserter instrument to help demonstrate to the user the insertion orientation of the non-threaded anchor during use. By way of example, as shown in FIG. 7, the handle of the inserter instrument can have a shape that is representative of a portion of anatomy to which the anchor is to be inserted.

FIGS. 7-9 illustrate an exemplary embodiment of inserter instrument 200 having a handle 202 and an elongated shaft 204 extending from the handle 202. The elongated shaft 204 can be permanently or removably coupled to the handle 202. In this illustrated embodiment, as will be described in more detail below, the handle extends from a proximal end 206 to a distal end 208, and the proximal end 206 has a stylized bone shape that is modeled after a humerus bone 302 of a shoulder 300 (see FIG. 8). While the inserter instrument 200 is designed for a biceps repair procedure in which a biceps tendon is attached to bone, a person skilled in the art would appreciate that the inserter instrument can be designed for other surgical procedures (e.g., medial patellofemoral ligament reconstruction from the patella to the femur, lateral ankle ligament reconstruction, elbow collateral ligament reconstruction, posterior tibialis tendon reattachment or reconstruction, distal biceps tendon reattachment, or any other soft tissue graft, ligament, or tendon bony attachment), and therefore, the stylized bone shape can be modeled after another bone or joint (e.g., the femur, tibia, patella, ankle, elbow, etc.) to be operated on during such other surgical procedure.

As shown in FIGS. 7 and 8, the proximal end 206 is wider than the distal end 208 of the handle 202 and has a generally similar shape to that of the humerus head 304 of the humerus bone 302. Further, as shown in more detail in FIG. 9, the proximal end 206 of the handle 202 includes at least one indicator feature 210. This at least one indicator feature 210 generally correlates (e.g., in size, shape, and/or position) to a landmark 306 on the humerus bone 302. In this illustrated embodiment, the landmark 306 is the bicipital groove of the humerus bone 302. As such, the at least one indicator feature 210 is in the form of a groove that extends inward from the outer-most front surface 203 of the handle 202. While the proximal end 206 of the handle 202 includes one indicator feature that is representative of the bicipital grove of the humerus bone, in other embodiments, the proximal end can include additional or different indicator features that are representative of other landmarks of the humerus bone.

Further, in some embodiments, the top surface 212 of the handle 202 can have a generally flat configuration, as illustrated in FIGS. 7-9. This configuration can help enhance the interface between the handle 202 and a driver instrument (e.g., a mallet). That is, the generally flat configuration of the top surface 212 can help maximize the contact between the handle 202 and the driver instrument while the driver instrument is tapping or otherwise pushing the handle 202 to thereby tap or push the coupled non-threaded anchor into a bone docket.

The handle 202 can include additional elements. For example, as shown in FIGS. 7 and 8, the handle 202 includes a cleat 214 that extends outward from the distal end 208 of the handle 202. The cleat 214 is configured to allow free end(s) of a suture (e.g., a stay suture 402 in FIGS. 10A-10B) to be wrapped about the cleat 214 to allow the suture to be selectively secured to the handle 202 (e.g., for purposes of removably securing the non-threaded anchor to the handle). The cleat 214 can have a variety of configurations. The cleat 214 includes a spool structure 214a, In use, once the stay suture is threaded through the auxiliary suture holes (e.g., auxiliary suture holes 117a, 117b of non-threaded anchor 100 in FIGS. 1-7), the stay suture is wrapped around the spool structure 214a and removably fixed to the cleat 214.

In some embodiments, the handle 202 can include various features that can assist with gripping the handle 202 (e.g., during use of the inserter instrument 200). For example, the handle 202 can include gripping features, such as grooves 216, that can assist with allowing the user to efficiently and effectively grasp the handle 202 for non-threaded anchor coupling, soft tissue threading, and/or non-threaded anchor insertion into bone. While the grooves 216 can be positioned at any location along the handle 202, as shown in FIGS. 7 and 8, the grooves 216 are positioned proximal to the distal end 208 of the handle 202. Alternatively, or in addition, at least a portion of the outer-most front surface 203 of the handle 202 can have a roughened finish that can increase friction between a user's hand and the handle 202 during use, thereby enhancing the user's grip about the handle 202.

While the elongated shaft 204 can have a variety of configurations, in this illustrated embodiment, the elongated shaft 204 is generally cylindrical in shape along the majority of its length. As shown in FIG. 7, the distal end 218 of the elongated shaft 204 has a tapered configuration that terminates at a driving surface 219. While not shown, the driving surface 219 has a generally rectangular shape. In other embodiments, the driving surface 219 can have any other suitable shape. Further, the distal end 218 includes an inserter prong 220. The inserter prong 220 extends distally from the driving surface 219. The inserter prong 220 is configured to be received within a bore (e.g., bore 199 in FIG. 5) extending into a proximal end of a non-threaded anchor to removably couple to the non-threaded anchor (e.g., non-threaded anchor 100 in FIGS. 1-7). While the inserter prong can have a variety of configurations, in this illustrated embodiment the inserter prong has a generally cylindrical shape. A person skilled in the art will appreciate that the structural configuration of the inserter prong depends at least upon the shape and size of the bore within the non-threaded anchor to be coupled the inserter instrument 200. In certain embodiments, when the structurally configuration of the inserter prong 220 is not complementary to the bore of the non-threaded anchor, the elongated shaft 204 can be removed from the handle 202 (e.g., by pulling the elongated shaft 204 away from and relative to the handle 202 or vice versa) and another elongated shaft having an inserter prong of a different shape and/or size can be coupled to the handle for subsequent use.

In some embodiments, as shown in FIG. 7, the distal end 218 of the elongated shaft 204 includes at least one marking 222. While the at least one marking can have a variety of configurations, in this illustrated embodiment, the at least one marking 222 is defined between a first border line 224a and a second border 224b. Each of the first and second border lines 224a, 224b at least partially wrap about the elongated shaft 204. The at least one marking 222 is configured to be associated with a desired insertion depth of a non-threaded anchor when the non-threaded anchor is being inserted into a bone socket. For example, the desired insertion depth can be below the cortical bone. As such, the at least one marking 222 can be positioned on the distal end 218 at a location that allows the user to determine when the non-threaded anchor is deployed below the cortical bone during the non-threaded anchor's insertion into the bone socket.

FIG. 10A illustrates an exemplary embodiment of a soft tissue anchoring system 400 that includes the non-threaded anchor 100 (FIGS. 1-6) coupled to the inserter instrument 200 (FIGS. 7-9). The soft tissue anchoring system 400 also includes a stay suture 402 that is used to further removably affix the non-threaded anchor 100 to the inserter instrument 200. The stay suture 402 is configured to maintain the fixation of the non-threaded anchor 100 to the inserter instrument 200 unassisted while a soft tissue segment (e.g., a tendon, ligament, or the like) is being connected to the non-threaded anchor 100 (see FIG. 14).

As shown in FIG. 10A, and in more detail in FIG. 10B, the stay suture 402 is threaded through the auxiliary suture holes 117a, 117b of the non-threaded anchor 100 and the distal end 218 of the elongated shaft 204 is partially inserted into the non-threaded anchor 100 such that the inserter prong 220 (obstructed) is received within the bore 119 (obstructed) of the non-threaded anchor 100. The non-threaded anchor 100 is positioned such that the guide region 116 (obstructed) is clocked to align with the cleat 214. Further, the stay suture 402 is wrapped around the spool structure 214a and fixed in the cleat 214.

As further shown in FIGS. 10A and 10B, the soft tissue anchoring system 400 includes a threader tab 404 having at least one feeder wire coupled thereto. In this illustrated embodiment, two feeder wires 406, 408 are coupled to the threader tab 404 and each is threaded through the a respective one of the two suture holes 110a, 110b of the distal nose 106 of the non-threaded anchor 100. This loads the threader tab 404 to the non-threaded anchor 100. Further, the two feeder wires 406, 408 are each in a looped configuration. This allows free ends of a suture (e.g., tendon suture 504 in FIGS. 14-16) attached to a soft tissue segment (e.g., biceps tendon 500 in FIGS. 14-17) to be passed therethrough and couple to the threader tab 404. In use, once the free ends of the suture are placed in respective feeder wires 406, 408, the threader tab 404 is pulled away from the non-threaded anchor 100 to shuttle the suture through the two suture holes 110a, 110b of the non-threaded anchor 100.

Figure 11:
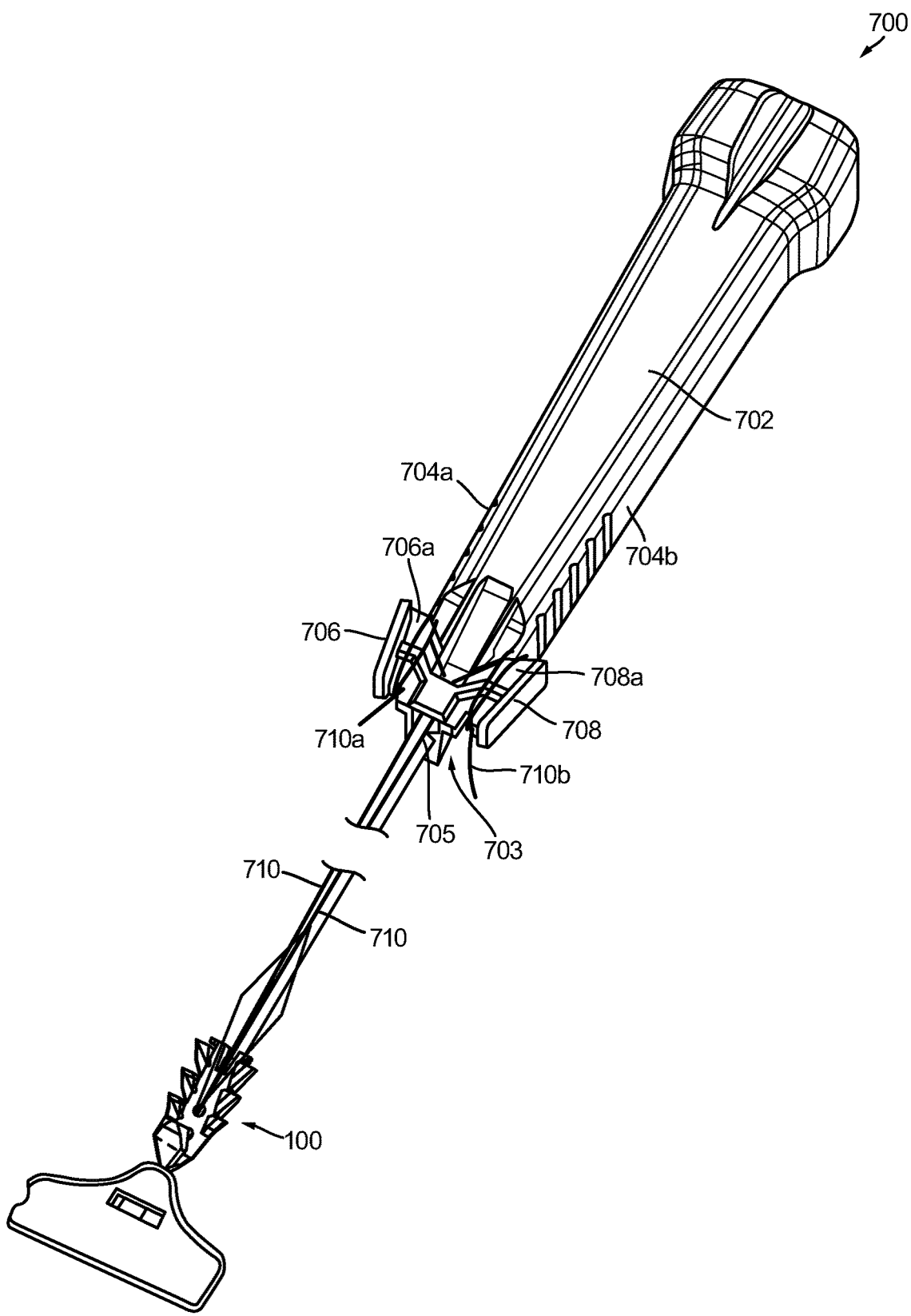
FIG. 11 is a front perspective view of an exemplary embodiment of a soft anchoring system with the anchor of FIG. 1 coupled to an inserter instrument.

FIG. 11 illustrates another embodiment of a soft tissue anchoring system 700. Aside from the differences described below, the soft tissue anchoring system 700 is similar to the soft tissue anchoring system 400 in FIG. 10A and therefore common features are not described in detail herein. As shown, the soft tissue anchoring system 700 includes first and second cleats 706, 708 that extend outward from first and second lateral sides 704a, 704b of the handle 702, respectively. Further, the handle 702 includes a lumen 705 that extends through the distal end 703 of the handle 702. The lumen is configured to receive and allow the stay suture 710 to be passed therethrough.

The first and second cleats 706, 708 are each configured to allow a respective free end 710a, 710b of a stay suture 710 to be wrapped thereabout to allow the stay suture 710 to be selectively secured to the handle 702 (e.g., for purposes of removably securing the non-threaded anchor 100 to the handle 702). In use, the stay suture is threaded through the non-threaded anchor 100, passed through the lumen 705 and wrapped about the first and second cleats 706, 708. In other embodiments, both free ends 710a, 710b can be wrapped about the same cleat, for example, either the first cleat 706 or the second cleat 708. The first and second cleats 706, 708 can have a variety of configurations. In this illustrated embodiment, the first and second cleats 706, 708 each include a respective spool structure 706a, 708b. In use, once the stay suture is threaded through the auxiliary suture holes 117a, 117b (obstructed) of non-threaded anchor 100, the free end 710a is wrapped around the spool structure 706a and removably fixed to the cleat 706, and the free end 710b is wrapped around the spool structure 708a and removably fixed to the cleat 708.

Figure 12:
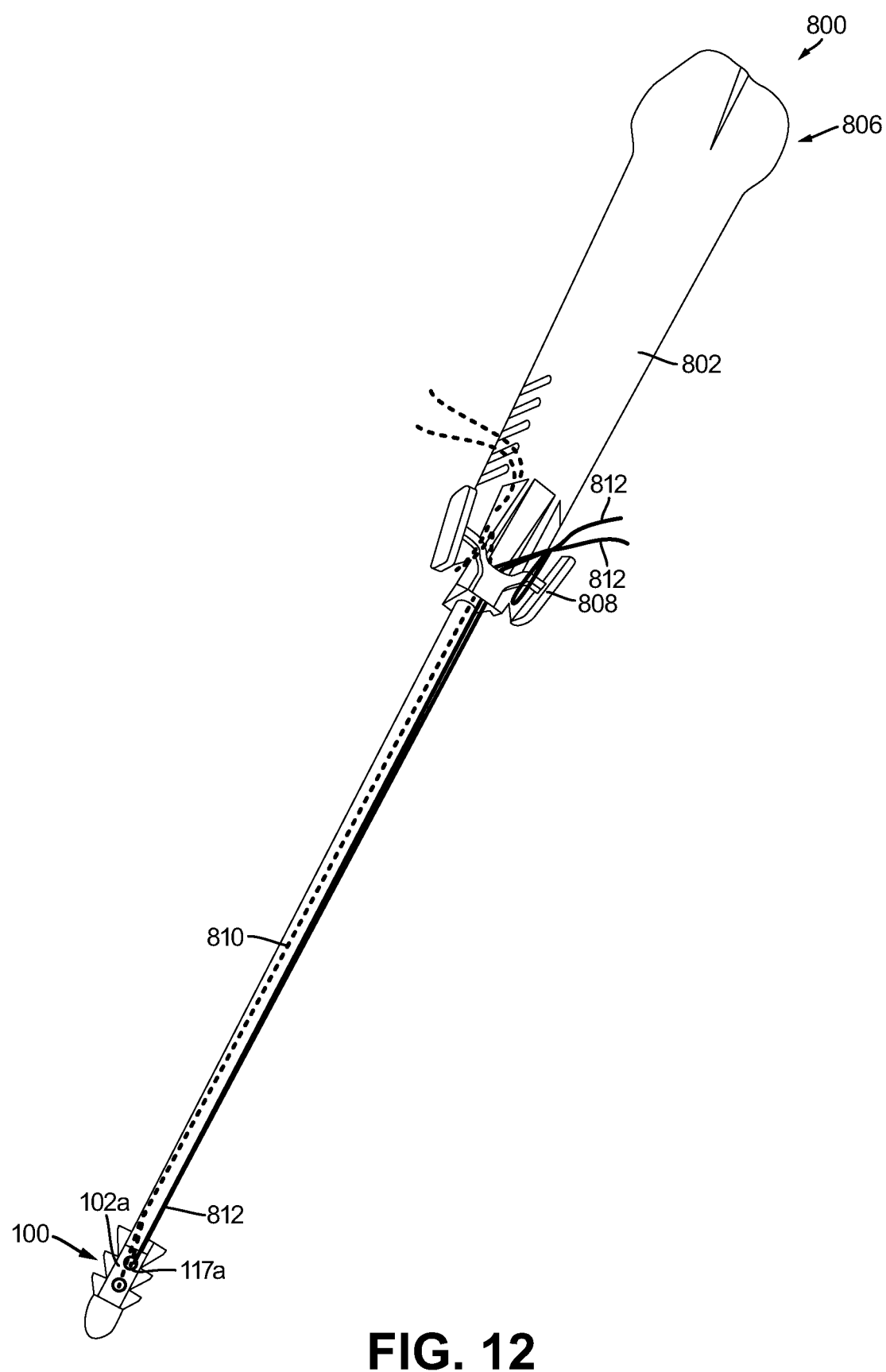
FIG. 12 is a front perspective view of an exemplary embodiment of a soft anchoring system with the anchor of FIG. 1 coupled to an inserter instrument, the system having a stay suture and a fixation suture.

In some embodiments, alternatively or in addition, a soft tissue anchoring system can include a fixation suture, for example, as shown in FIG. 12, which is configured to help further fixate a soft tissue to the non-threaded anchor. Aside from the differences described below, the soft tissue anchoring system 800 illustrated in FIG. 12 is similar to the soft tissue anchoring system 700 in FIG. 11 and therefore common features are not described in detail herein. As shown, in addition to the stay suture 810, the soft tissue anchoring system 800 also includes a fixation suture 812 that is threaded through auxiliary suture hole 117a of the non-threaded suture 100. In use, as shown in FIGS. 13A-13C, the fixation suture 812 forms a loop 814 (FIG. 13A), and once the soft tissue segment 801 is connected to the non-threaded anchor 100 (e.g., via knotting the free ends 816a, 816b of a tissue suture 816 (e.g., tendon suture) against the distal nose 106), the loop 814 of the fixation suture 812 is passed over the distal nose 106 and the soft tissue segment 801 (FIG. 13B). The fixation suture 812 is then pulled (e.g., towards the proximal end 806 of the handle 802) and wrapped about the second cleat 808 to thereby tighten the loop 814 about the non-threaded anchor 100 and connected soft tissue segment 801 (see FIGS. 12 and 13C). As a result, the soft tissue segment 801 is secured against the back surface 102a (see FIG. 12) of the non-threaded anchor 100. This securement helps to minimize toggling between the non-threaded anchor 100 and the connected soft tissue segment 801 (e.g., during insertion in a bone socket). After implantation of the non-threaded anchor 100 and connected soft tissue segment 801, the fixation suture 812 can be removed. In certain embodiments, the fixation suture 812 can be cut and knotted, rather than cleated, to thereby secure the soft tissue segment 801 against the back surface 102 during and after insertion. Alternatively, or in addition, a free needle (not shown) can be used to pass the fixation suture 812 through the soft tissue segment 801 for additional fixation to the non-threaded suture 100.

FIGS. 14-17 schematically illustrates an exemplary embodiment of using the soft tissue anchoring system 400 (FIGS. 10A-10B) in a biceps tendon repair procedure. More specifically, FIGS. 14-17 illustrate coupling a biceps tendon 500 to the non-threaded anchor 100 (FIGS. 1-6 and 10A-10B) and inserting, via the inserter instrument 200 (FIGS. 7-10B), the non-threaded anchor 100 into a bone socket 502 formed within a humerus bone 600. While not shown, the biceps tendon 500 is first released from the glenoid attachment and a portion of the biceps tendon 500 is pulled out of or otherwise externalized from the patient. The biceps tendon 500 is then sized and thereafter stitched via a tendon suture 504. The bone socket 502 is then formed in the humerus bone 600 (e.g., by drilling). The two free ends 504a, 504b of the tendon suture 504 are placed within respective feeder wires 406, 408 and the threader tab 404 is pulled away from the non-threaded anchor 100 to cause the tendon suture 504 to be threaded through the two suture holes 110a, 110b of the distal nose 106 of the non-threaded anchor 100.

Figure 15:
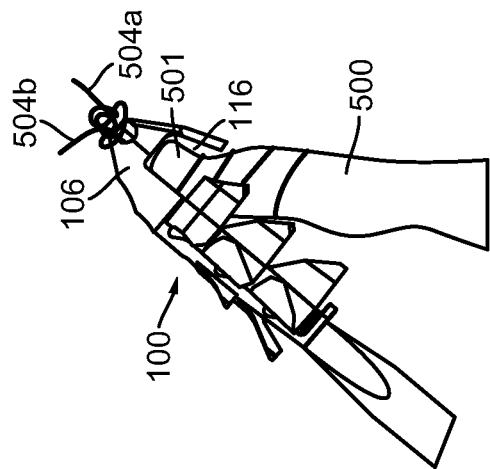
FIG. 15 is a schematic illustrating a magnified view of the end of the bicep tendon being knotted to the anchor of the soft anchoring system of FIG. 10A.
Figure 14:
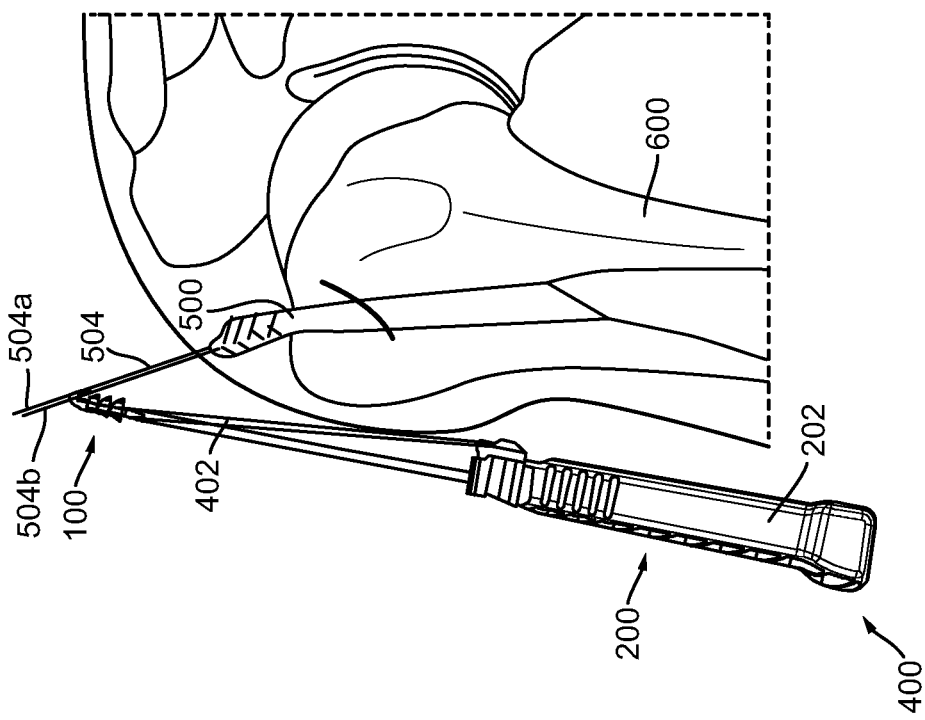
FIG. 14 is a schematic illustrating an end of a bicep tendon that is released from a glenoid attachment of a shoulder being threaded to the anchor of the soft anchoring system of FIG. 10A.
Figure 16:
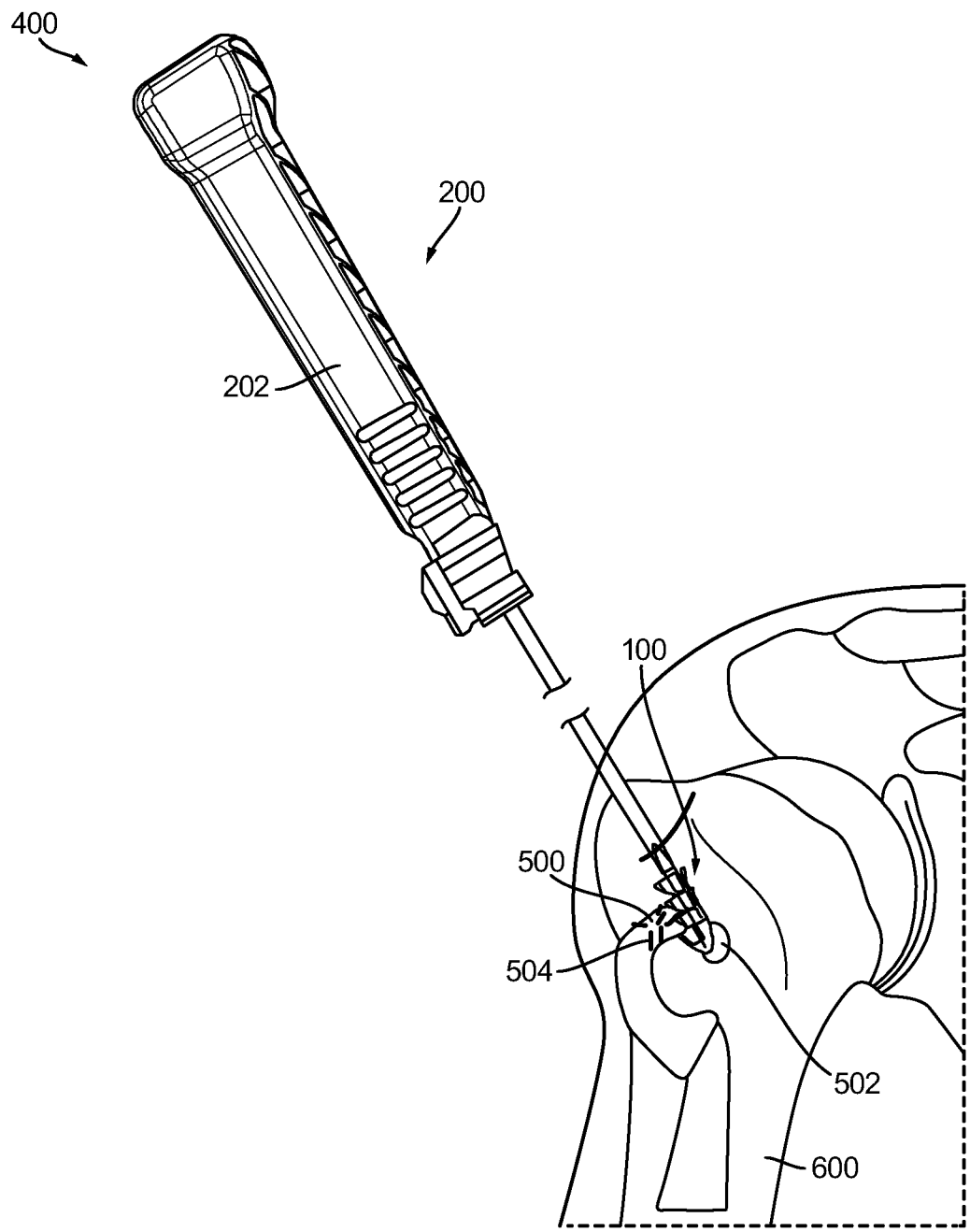
FIG. 16 is a schematic illustrating the anchor with the secured bicep tendon coupled thereto being docketed into a bone socket created within the shoulder of FIG. 14.

Once the tendon suture 504 is threaded through the two suture holes 110a, 110b, the non-threaded anchor 100 is advanced down the tendon suture 504 (FIG. 14) until the leading end 501 of the biceps tendon 500 is positioned within the guide region 116 of the non-threaded anchor 100 (FIG. 15). As shown in FIG. 15, the two free ends 504a, 504b are then knotted together to secure the leading end 501 within the guide region 116, and consequently connect the biceps tendon 500 to the non-threaded anchor 100. More specifically, the biceps tendon 500 is therefore secured between the deflectable clip 104 and the spine 108 of the non-threaded anchor 100. In other embodiments, the tendon suture 504 can be attached to the non-threaded anchor 100, for example, by a knot and keyhole opening, a locking loop (e.g., adjustable loop technology), or pulling the suture into a tight slot to pinch it.

Figure 17:
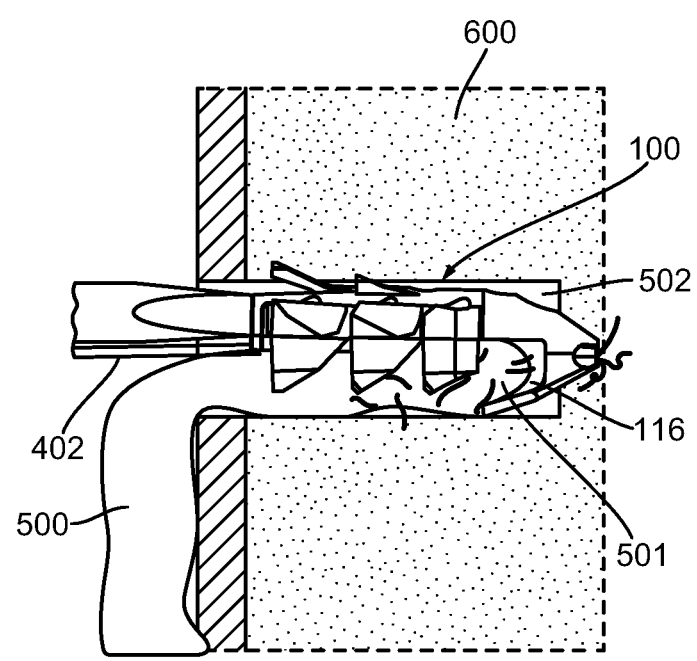
FIG. 17 is a schematic cross-sectional view of a portion of the shoulder of FIG. 14, showing the anchor and the secured bicep tendon fully inserted into the bone socket.

Once secured and connected, the user introduces the non-threaded anchor 100 into the patient (FIG. 16) and docks the non-threaded anchor 100 in the bone socket 502 using the inserter instrument 200. While not shown, the non-threaded anchor 100 and connected biceps tendon 500 is then pushed into the bone socket 502 to a desired depth (FIG. 17). The non-threaded anchor 100 and the connected biceps tendon 500 can be pushed into the bone socket 502 using a driver (e.g., a mallet). Alternatively, or in addition, a user can themselves apply a downward force to the handle 202 that is effective to advance the non-threaded anchor 100 and connected bicep tendon 500 through the bone socket 502. Once the non-threaded anchor 100 is at its desired depth, the stay suture 402 can be released from the cleat 214 from the handle 202 and the inserter instrument 200 can be removed from the non-threaded anchor 100, and thus the patient. The stay suture 402 can then be removed from the patient.

In the present disclosure, like-named components of the embodiments generally have similar features, and thus within a particular embodiment each feature of each like-named component is not necessarily fully elaborated upon. Additionally, to the extent that linear or circular dimensions are used in the description of the disclosed anchors, anchoring systems, and methods, such dimensions are not intended to limit the types of shapes that can be used in conjunction with such implants, implant systems, and methods. A person skilled in the art will recognize that an equivalent to such linear and circular dimensions can easily be determined for any geometric shape. Sizes and shapes of the anchors and anchoring systems, and the components thereof, can depend at least on the anatomy of the subject in which the anchors and anchoring systems will be used, the size and shape of components with which the anchors and anchoring systems will be used, and the methods and procedures in which the anchors and anchoring systems will be used.

Values or ranges may be expressed herein as "about" and/or from/of "about" one particular value to another particular value. When such values or ranges are expressed, other embodiments disclosed include the specific value recited and/or from/of the one particular value to another particular value. Similarly, when values are expressed as approximations, by the use of antecedent "about," it will be understood that here are a number of values disclosed therein, and that the particular value forms another embodiment. It will be further understood that there are a number of values disclosed therein, and that each value is also herein disclosed as "about" that particular value in addition to the value itself. In embodiments, "about" can be used to mean, for example, within 10% of the recited value, within 5% of the recited value or within 2% of the recited value.

For purposes of describing and defining the present teachings, it is noted that unless indicated otherwise, the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety. Any patent, publication, or information, in whole or in part, that is said to be incorporated by reference herein is only to the extent that the incorporated material does not conflict with existing definitions, statements, or other disclosure material set forth in this document. As such the disclosure as explicitly set forth herein supersedes any conflicting material incorporated herein by reference.

What is claimed is:

1. An anchor, comprising:
   a non-threaded, asymmetric anchor body having a distal nose and a spine extending proximally from one side of the distal nose, the spine defining a back surface of the anchor body and having an outer bone engaging surface, an inner tissue seating surface opposite the outer bone engaging surface, and opposed lateral sides;
   a single deflectable clip, wherein the single deflectable clip extends proximally from a side of the nose opposite the spine, the deflectable clip and a portion of the spine defining a guide region configured to accommodate and shield a leading end of a soft tissue to be attached to bone;
   a plurality of pairs of deflectable wings, each deflectable wing extending from the spine to a terminal end;

at least one pair of suture recesses positioned proximally adjacent to at least one pair of deflectable wings, each suture recess being configured to at least partially house a suture, wherein a first suture recess of the at least one pair of suture recesses extends inward towards the spine and through one of the lateral sides of the spine and a second suture recess of the at least one pair of suture recesses extends inward toward the spine and through another one of the lateral sides of the spine such that a suture seated within at least one of the first or second suture recess does not interfere with the deflection of the deflectable wings; and a plurality of narrower sections that aid retention of the soft tissue during assembly of the soft tissue to the anchor body, each narrower section is positioned distal to the terminal end of a respective deflectable wing of the plurality of pairs of deflectable wings and further positioned lateral and proximate to a respective suture recess of the at least one pair of suture recesses, wherein each narrower section has a dimension smaller than a dimension of the respective suture recess at least before deflection of the respective deflectable wing.

2. The anchor of claim 1, wherein a distal tip of the distal nose has at least two suture holes extending longitudinally therethrough.

3. The anchor of claim 2, wherein the at least two suture holes are positioned laterally adjacent to each other.

4. The anchor of claim 2, wherein the at least two suture holes are configured to receive an operative suture to maintain the leading end of the soft tissue at a distal end of the guide region.

5. The anchor of claim 1, wherein the plurality of pairs of deflectable wings extends from the lateral sides of the spine, each pair being spaced longitudinally along the spine with each wing having a portion that extends above and beyond the tissue seating surface of the spine to define a soft tissue encompassing side surface.

6. The anchor of claim 1, wherein each suture recess extends through the lateral side of the spine along a path that is at least partially arcuate.

7. The anchor of claim 1, further comprising at least one bone engaging barb formed on the outer bone engaging surface.

8. The anchor of claim 1, further comprising at least one deflectable back wing extending from the outer bone engaging surface.

9. The anchor of claim 1, further comprising a pair of orientation tabs extending laterally from a proximal end of the lateral sides of the spine, wherein the pair of orientation tabs are configured to restrict lateral movement of the anchor when it is inserted into bone.

10. The anchor of claim 1, wherein the anchor body has at least one bore formed at a proximal end of the anchor body and extending distally into the anchor body, the bore being configured to receive a distal end of an inserter instrument.

11. An anchor, comprising:
a non-threaded, asymmetric anchor body having a distal nose and a spine extending proximally from one side of the distal nose, the spine defining a back surface of the anchor body and having an outer bone engaging surface, an inner tissue seating surface opposite the outer bone engaging surface, and opposed lateral sides;
a deflectable clip extending proximally from a side of the nose opposite the spine, the deflectable clip and a portion of the spine defining a guide region configured to accommodate and shield a leading end of a soft tissue to be attached to bone; and
a plurality of pairs of deflectable wings, each wing having a first portion and a second portion, wherein the first portion extends from one of the lateral sides of the spine, and wherein the second portion extends away from the first portion and above and beyond the first portion and the tissue seating surface of the spine in a direction that the tissue seating surface is facing to thereby define a soft tissue encompassing side surface of the anchor.

12. The anchor of claim 11, wherein each pair of the plurality of pairs of deflectable wings are spaced longitudinally along the spine.

13. The anchor of claim 11, further comprising at least one pair of suture recesses positioned proximally adjacent to at least one pair of deflectable wings, each suture recess being configured to at least partially house a suture, wherein each suture recess extends through a lateral side of the anchor body such that a suture seated within the suture recess does not interfere with the deflection of the at least one pair of deflectable wings.

14. The anchor of claim 13, wherein each suture recess extends through the lateral side of the anchor body along a path that is at least partially arcuate.

15. The anchor of claim 11, further comprising at least one bone engaging barb formed on the outer bone engaging surface or at least one deflectable back wing extending from the outer bone engaging surface.

16. The anchor of claim 11, further comprising a pair of orientation tabs extending laterally from a proximal end of the lateral sides of the spine, wherein the pair of orientation tabs are configured to restrict lateral movement of the anchor when it is inserted into bone.

17. The anchor of claim 11, wherein the anchor body has at least one bore formed at a proximal end of the anchor body and extending distally into the anchor body, the bore being configured to receive a distal end of an inserter instrument.

18. The anchor of claim 11, wherein a distal tip of the distal nose has at least two suture holes extending longitudinally along a longitudinal axis of the anchor.

19. The anchor of claim 18, wherein the at least two suture holes are positioned laterally adjacent to each other.

20. The anchor of claim 18, wherein the at least two suture holes are configured to receive an operative suture to maintain the leading end of the soft tissue at a distal end of the guide region.

* * * * *